United States Patent
Jain et al.

(10) Patent No.: US 9,137,825 B2
(45) Date of Patent: Sep. 15, 2015

(54) SCANNING OF CHANNELS BASED ON CHANNEL AVAILABILITY INFORMATION

(75) Inventors: Ankur Jain, Redwood City, CA (US); Rabendra Kumar Patel, San Mateo, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 127 days.

(21) Appl. No.: 13/823,765

(22) PCT Filed: Mar. 16, 2012

(86) PCT No.: PCT/US2012/029437
§ 371 (c)(1),
(2), (4) Date: Mar. 15, 2013

(87) PCT Pub. No.: WO2013/137909
PCT Pub. Date: Sep. 19, 2013

(65) Prior Publication Data
US 2014/0192726 A1    Jul. 10, 2014

(51) Int. Cl.
*H04W 76/02* (2009.01)
*H04W 24/00* (2009.01)
*H04W 74/08* (2009.01)
*H04W 48/08* (2009.01)
*H04W 48/16* (2009.01)
*H04W 88/06* (2009.01)

(52) U.S. Cl.
CPC .............. *H04W 74/08* (2013.01); *H04W 48/08* (2013.01); *H04W 48/16* (2013.01); *H04W 88/06* (2013.01)

(58) Field of Classification Search
CPC ...... H04W 74/08; H04W 88/06; H04W 48/16; H04W 76/00; H04W 48/20; H04W 48/18; H04W 48/17; H04W 48/02; H04W 48/00; H04W 40/00; H04W 36/06; H04W 36/00
USPC .......................... 370/252, 254, 255, 328, 338; 455/161.1, 434
See application file for complete search history.

(56) References Cited

U.S. PATENT DOCUMENTS

| 8,527,014 B2 * | 9/2013 | Amerga et al. ............... 455/574 |
| 2004/0203824 A1 * | 10/2004 | Mock et al. ................ 455/452.1 |

(Continued)

FOREIGN PATENT DOCUMENTS

WO    2011/122763 A2    10/2011

OTHER PUBLICATIONS

International Search Report and Written Opinion dated Sep. 11, 2012 issued in corresponding PCT application No. PCT/PCT/US2012/029437, 11 pages.

(Continued)

*Primary Examiner* — Ahmed Elallam
(74) *Attorney, Agent, or Firm* — Snyder, Clark, Lesch & Chung, LLP

(57) ABSTRACT

A user device comprising a communication interface; one or more memories to store instructions; and one or more processors to execute the instructions to receive channel-availability information that indicates one or more channels supported by and available to the user device; store the channel-availability information; scan one or more channels indicated in the channel-availability information; and connect to a network using one of the one or more channels.

20 Claims, 11 Drawing Sheets

(56) References Cited

U.S. PATENT DOCUMENTS

| | | | |
|---|---|---|---|
| 2008/0146223 A1* | 6/2008 | Welnick et al. | 455/434 |
| 2009/0137247 A1 | 5/2009 | Mok | |
| 2009/0143067 A1* | 6/2009 | Kim et al. | 455/434 |
| 2009/0270091 A1* | 10/2009 | Joshi et al. | 455/434 |
| 2010/0081433 A1* | 4/2010 | Lee | 455/434 |
| 2010/0234021 A1* | 9/2010 | Ngai et al. | 455/433 |
| 2011/0306364 A1 | 12/2011 | Gossain et al. | |
| 2012/0076045 A1* | 3/2012 | Pease et al. | 370/254 |
| 2012/0127955 A1* | 5/2012 | Gandham et al. | 370/331 |
| 2012/0149412 A1* | 6/2012 | Nergis et al. | 455/501 |
| 2012/0184318 A1* | 7/2012 | Lee et al. | 455/515 |
| 2013/0039181 A1* | 2/2013 | Chao | 370/235 |

OTHER PUBLICATIONS

International Preliminary Report on Patentability and Written Opinion issued in corresponding PCT application No. PCT/US2012/029437, dated Sep. 25, 2014, 7 pages.

* cited by examiner

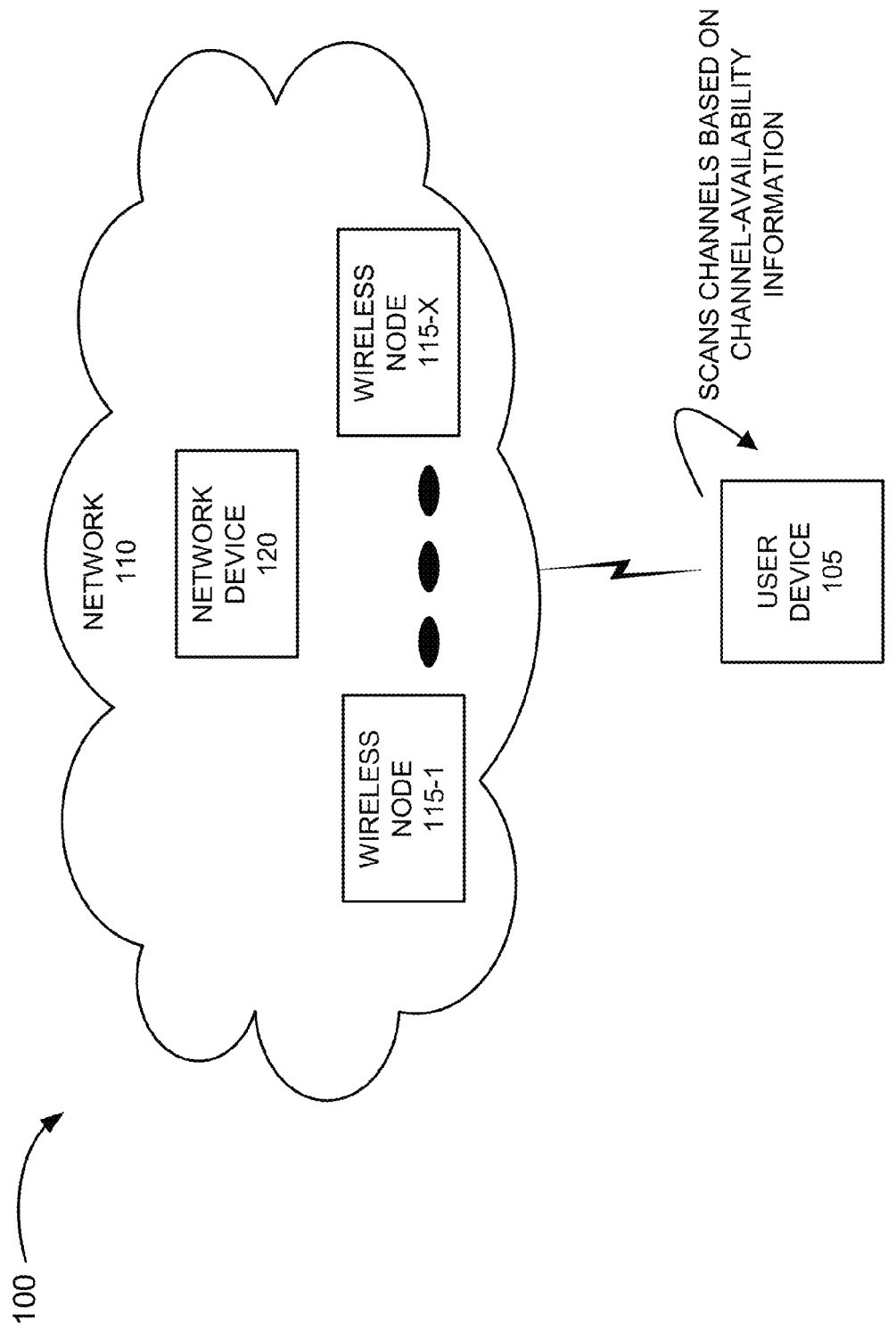

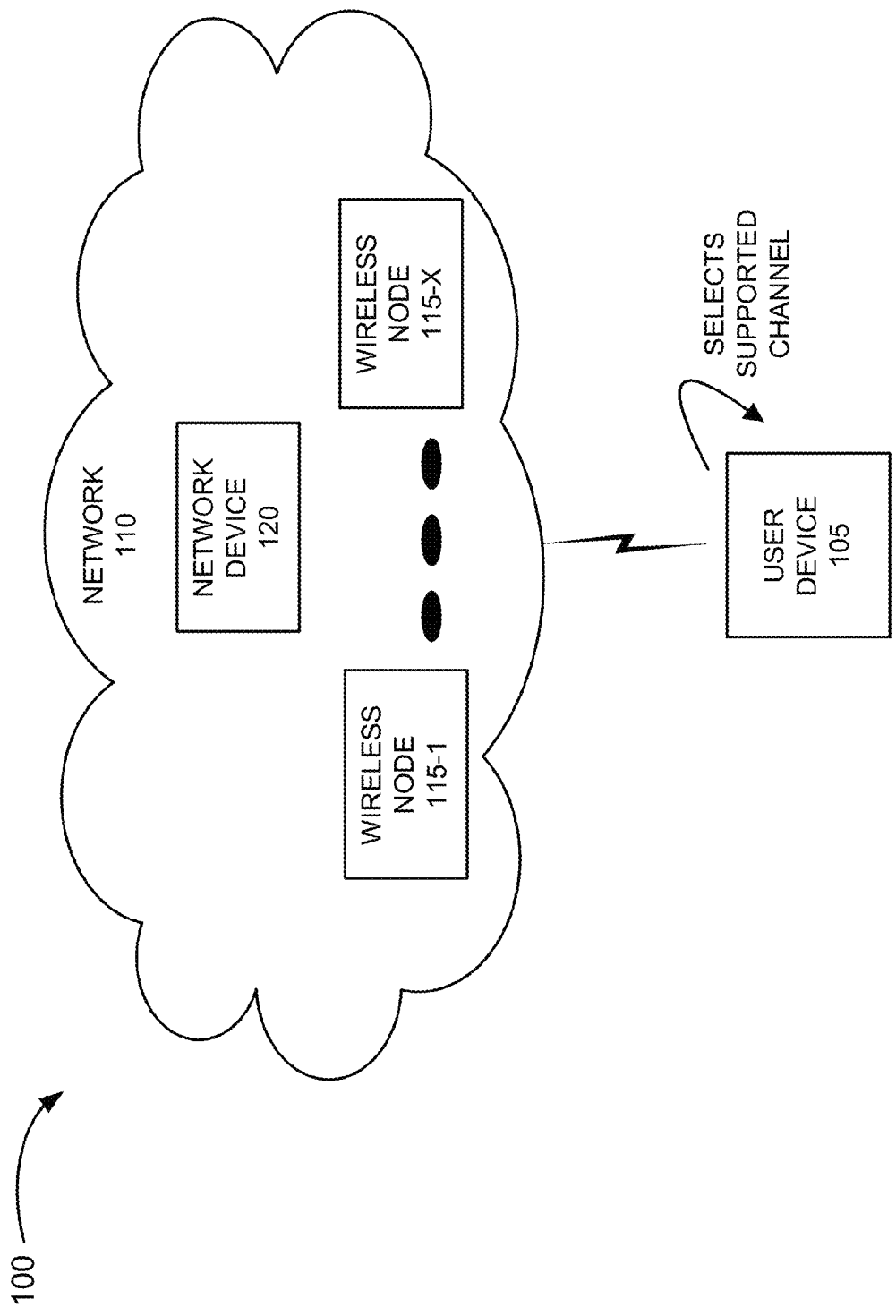

SCANNING OF CHANNELS BASED ON CHANNEL AVAILABILITY INFORMATION

BACKGROUND

A user device, such as a mobile device, connects to a wireless node, such as a base station, to access a network. According to one approach, the user device stores a list that indicates supported channels for each access technology. The user device scans the supported channels based on the list. However, the number of channels and access technologies supported by user devices are increasing as a result of, for example, the offering of anywhere, anytime services by service providers.

SUMMARY

According to one aspect, a user device may comprise a communication interface; one or more memories to store instructions, and one or more processors. The one or more processor may execute the instructions to receive, via the communication interface, channel-availability information that indicates one or more channels supported by and available to the user device, store the channel-availability information, scan one or more channels indicated in the channel-availability information, and connect, via the communication interface, to a network using one of the one or more channels.

Additionally, the one or more channels may pertain to one or more channels supported by the user device and available to the user device in a current location of the user device.

Additionally, the one or more channels may be less than a total number of channels supported by the user device, and/or the one or more channels may pertain to one or more channels supported by the user device and available to the user device in a location other than the current location of the user device.

Additionally, the user device may identify a connection loss to the network, and adjust a frequency in which the user device scans based on the channel-availability information.

Additionally, the user device may recognize that a number of supported and available channels is high based on a comparison to a threshold value, and may increase the frequency in which the user device scans relative to a default frequency.

Additionally, the user device may recognize that a number of supported and available channels is low based on a comparison to a threshold value, and may decrease the frequency in which the user device scans relative to a default frequency.

Additionally, the user device may comprise a mobile communication device having telephone capabilities.

According to another aspect, a method may comprise receiving channel-availability information that indicates one or more channels supported by and available to a user device in a location, storing the channel-availability information, scanning one or more channels indicated in the channel availability information when the user device is located in the location, and connecting to a network using one of the one or more channels.

Additionally, the method may comprise identifying a connection loss to the network, and adjusting a frequency in which the user device scans based on the channel-availability information.

Additionally, the method may comprise recognizing that a number of supported and available channels is high based on a comparison to a threshold value, and increasing the frequency in which the user device scans relative to a default frequency.

Additionally, the method may comprise transmitting a channel-availability request that comprises location information and a device identifier pertaining to the user device.

Additionally, the method may comprise identifying a connection loss to the network; and ceasing to scan, in response to the identifying, for a supported channel until a triggering event occurs.

Additionally, the triggering event may comprise that the user device moves a predetermined distance from a location that the connection loss occurred.

Additionally, the method may comprise selecting channel-availability information based on location information and a device identifier associated with the user device, wherein the selecting may comprise identifying one or more channels and one or more access technologies supported by the user device, identifying one or more channels and one or more access technologies available to the user device in correspondence to the location information, and selecting one or more channels and one or more access technologies that are available to the user device in correspondence to the location information and is/are supported by the user device.

DESCRIPTION OF THE DRAWINGS

The accompanying drawings, which are incorporated in and constitute a part of this specification, illustrate exemplary embodiments described herein and, together with the description, explain these exemplary embodiments.

FIGS. 1B-1D are diagrams illustrating an exemplary process for using channel-availability information in the environment depicted in FIG. 1A;

DETAILED DESCRIPTION

Figure 1A:
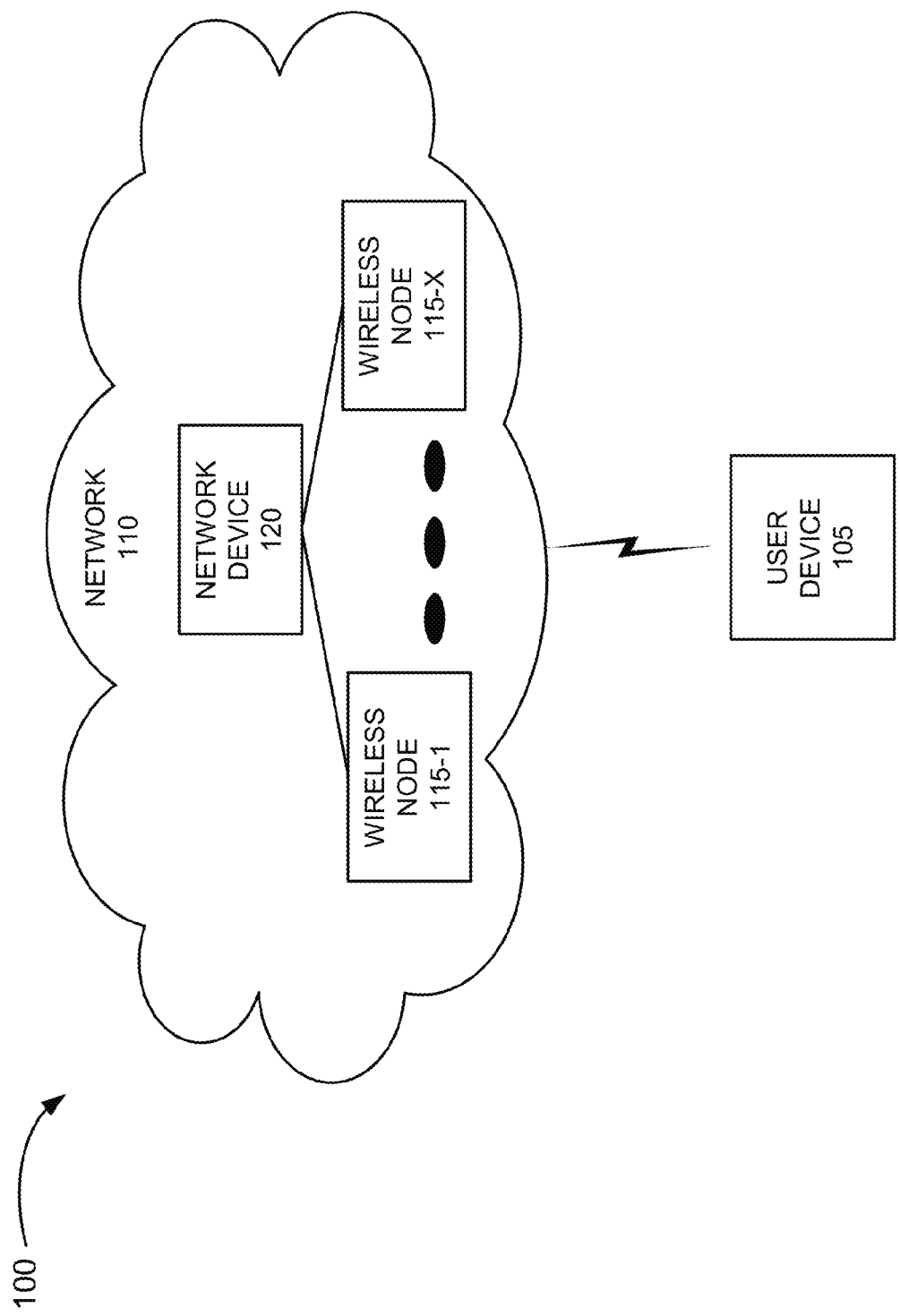
FIG. 1A is a diagram illustrating an exemplary environment in which channel selection based on channel-availability information may be implemented.

The following detailed description refers to the accompanying drawings. The same reference numbers in different drawings may identify the same or similar elements.

The term "channel," as used herein, is intended to be broadly interpreted. Depending on the communication standard, a channel may be implemented based on, for example, a frequency band, a frequency spectrum, a frequency spread, a carrier frequency, a center frequency, or some other wireless resource designation.

The user device can take an excessive period of time to scan through all of the supported channels for associated access technologies. In particular, the user device can scan through all of the supported channels even when all of the supported channels are not offered (e.g., not available) in the location of the user device. Additionally, if the user device is using a supported channel but losses its connection (e.g., due to poor reception, etc.) with a network, such an occurrence triggers a re-scanning of the supported channels. Such a scenario may result in, among other things, delay in establishing a new connection and consumption of resources (e.g., power, etc.). Additionally, under some circumstances, the re-scanning of all of the supported channels can occur even when there are not any supported channels or very few supported channels in the location of the user device (e.g., due to poor coverage, dead spots, etc.).

According to an exemplary embodiment, a user device, such as a mobile device, a portable device, or a handheld device, uses channel-availability information to select and use a channel supported by the user device. According to an exemplary embodiment, the user device obtains channel-availability information from a network device and stores the channel-availability information. According to an exemplary implementation, the network device includes a server device that stores a database or a data structure that comprises channel-availability information. According to an exemplary embodiment, the channel-availability information comprises information about what access technologies, channels, and carriers are available in a geographical locale and supported by a user device.

According to an exemplary embodiment, a scanning process, which is performed by the user device, uses the channel-availability information to select a supported channel. By way of example, the channel-availability information may indicate that a geographic locale in which the user device is located offers a subset of channels supported by the user device. In turn, the user device scans the subset of channels offered in the geographical locale rather than scanning all of the channels supported by the user device. Additionally, for example, the channel-availability information may indicate an order for which the user device scans the supported channels. The order may be based on one or more metrics or parameters (e.g., monetary cost to user to use, application or service used by the user, etc.), as described further below.

According to an exemplary embodiment, the scanning process uses the channel-availability information to manage a frequency or a time interval between scans. According to an exemplary embodiment, the scanning process uses user device movement information to manage the frequency or the time interval between scans.

FIG. 1A is a diagram illustrating an exemplary environment in which channel selection based on channel-availability information may be implemented. Environment 100 includes a user device 105 and a network 110. Network 110 includes wireless nodes 115-1 through 115-X, in which X>1 (also referred to collectively as wireless nodes 115 or individually as wireless node 115).

The number of devices and the configuration of devices and networks in environment 100 are exemplary. According to other embodiments, environment 100 may include additional devices, fewer devices, different devices, and/or differently arranged devices, than those illustrated in FIG. 1A. Additionally, according to other embodiments, environment 100 may include additional networks.

According to other embodiments, a single device illustrated in FIG. 1A may be implemented as multiple devices and/or multiple devices may be implemented as a single device. By way of example, network device 120 may be implemented as multiple devices. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and may involve intermediary device(s) and/or network(s) not illustrated in FIG. 1A. Additionally, the number and the arrangement of connections between the devices and the network are exemplary.

According to an exemplary embodiment, user device 105 comprises a portable device, a mobile device, a wrist-worn device, or a handheld device that operates, as described herein. By way of example, user device 105 may be implemented as a smart phone, a wireless phone (e.g., a cellphone, a radio telephone, etc.), a personal digital assistant (PDA), a data organizer, a picture capturing device, a video capturing device, a Web-access device, a music playing device, a location-aware device, a gaming device, a computer, and/or some other type of user device (e.g., a vehicular-based device, etc.). According to an exemplary embodiment, user device 105 comprises a scanning algorithm that scans channels for use and connection with network 110.

Network 110 includes one or multiple networks. For example, network 110 includes a wireless network (e.g., mobile network, cellular network, non-cellular network, an ad hoc network, etc.). By way of example, network 110 may be implemented as a Long Term Evolution (LTE) network, an evolved High Rate Packet Data (eHRPD) network, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, a Code Division Multiple Access (CDMA)-based network, or some combination thereof.

Wireless node 115 comprises a device that wirelessly communicates with user device 105. By way of example, wireless node 115 may be implemented as an evolved Node B (eNB), a base station (BS), a base station controller (BSC), a Node B, a base transceiver station (BTS), a relay node, a repeater, a home eNB (HeNB), a home node B (HNB), an edge node, a radio node, or a microwave node. Wireless node may support one access and/or wireless technology or multiple access and/or wireless technologies.

Network device 120 comprises a network device (also known as a network element) that stores and manages channel-availability information. By way of example, network device 120 may be implemented as a computational device (e.g., a computer) or a server device (e.g., an application server device). According to an exemplary implementation, the channel-availability information is stored in a database. The channel-availability information is described further below.

Figure 1B:
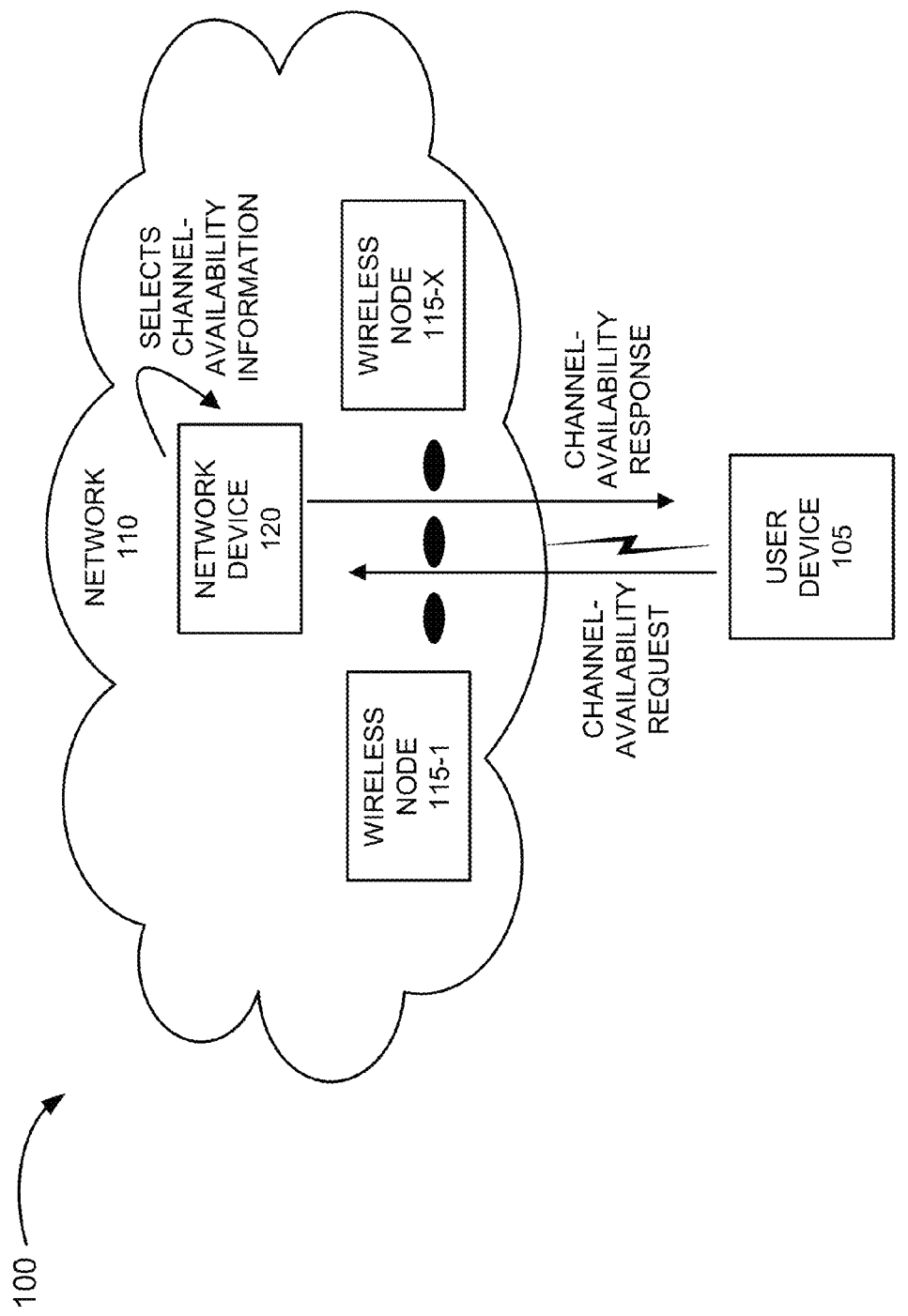

FIGS. 1B-1D are diagrams illustrating an exemplary process for using channel-availability information to select an available channel supported by user device 105. It may be assumed, as an initial state, that user device 105 does not include any channel-availability information or channel-availability information relevant to a geographical locale (e.g., a current location, a location proximate to the user's current location, etc.).

Referring to FIG. 1B, and according to an exemplary scenario, assume a user (not illustrated) powers on user device 105. User device 105 scans supported channels based on a default list that includes information indicating channels (e.g., all channels) supported by user device 105. User device 105 selects a channel and connects with network 110.

Subsequently, user device 105 generates and transmits a channel-availability request to network device 120. According to an exemplary implementation, user device 105 comprises software (e.g., a client application, a daemon program, etc.) that initiates communication with network device 120. According to an exemplary embodiment, the channel-availability request comprises a request to obtain channel-availability information. According to an exemplary implementation, the channel-availability request comprises information indicating a current locale of user device 105. For example, user device 105 may comprise location-aware capabilities or obtain current location information from network 110. Additionally, or alternatively, the channel-availability request comprises information indicating a locale other than the current location of user device 105. For example, the locale may be a prospective location based on the user's current location and movement information (e.g., direction, speed, etc.). Alternatively, the locale may be a location within a particular radius from the user's current location. The radius value may be user-configured. Alternatively, the user may specify a particular location (e.g., by city and state, zip code, or other geographic identifier). By way of example, the user may be taking a trip and would like channel-availability information for the locale he or she will be visiting.

In addition to location information, according to an exemplary implementation, the channel-availability request comprises user device profile information. For example, the user device profile information includes user device capability information or includes information that allows network device 120 to identify user device capability information based on the user device profile information. For example, user device profile information comprises a device identifier of user device 105. For example, the device identifier may be implemented as a Mobile Equipment Identifier (MEID) or an International Mobile Equipment Identity (IMEI). Network device 120 may identify user device capability information based on a correlation with the device identifier. For example, the make and model information included in the MEID or the IMEI is used to correlate and identify user device capability information.

Alternatively, user device profile information comprises user device capability information. For example, user device capability information comprises information indicating access technology(s) and channel(s) supported by user device 105. User device capability information may also include information indicating carrier(s).

The channel-availability request may comprise other types of information. By way of example, the channel-availability request comprises a user identifier. For example, the user identifier may be implemented as an International Mobile Subscriber Identity (IMSI). The user identifier may be used, by network device 120, to correlate channel-availability information. Additionally, the channel-availability request information may include user preference information. For example, the user may request channel-availability information, which is selected by network device 120, based on the user preference information. For example, the user may specify monetary cost as a preference, in which case, channels and access technologies that offer the lowest cost of use are selected. According to another example, the user may specify the type of service being used, and network device 120 may select channel-availability information based on the type of service. For example, a particular access technology may ordinarily offer greater bandwidth or bits/second than another access technology. For example, an LTE connection may offer greater upload and/or download speeds than a UMTS connection.

In response to receiving the channel-availability request, network device 120 selects channel-availability information for user device 105, as illustrated in FIG. 1B. According to an exemplary embodiment, network device 120 stores or has access to a channel-availability database or data structure that stores channel-availability information. An exemplary channel-availability database is described further below.

Figure 4:
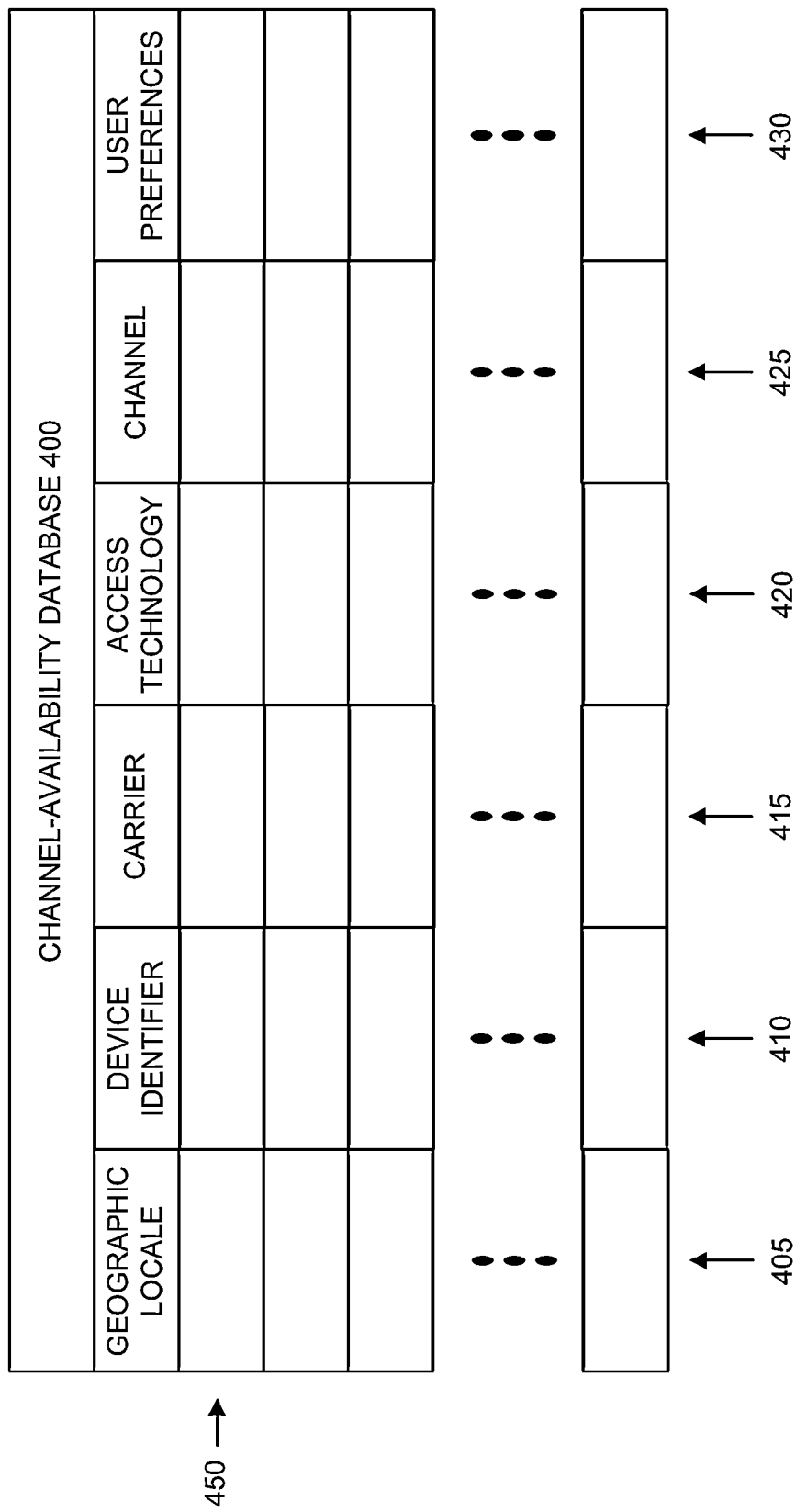
FIG. 4 is a diagram that illustrates an exemplary channel-availability database.

FIG. 4 is a diagram that illustrates an exemplary channel-availability database 400. As illustrated, channel-availability database 400 comprises a geographic locale field 405, a device identifier field 410, a carrier field 415, an access technology field 420, a channel field 425, and a user preferences field 430. According to other implementations, channel-availability database 400 may include additional fields, fewer fields, and/or different fields than those illustrated and described with respect to FIG. 4. Entry 450 is an example of a record that maps or correlates fields 405 through 430.

Geographic locale field 405 stores data or information that indicates a location or a geographical area. For example, the data or information may indicate a country, a state, a province, a city, a zip code, a longitude and a latitude, an altitude, a cell, a wireless node identifier, or other suitable information that identifies a location or a geographic area (e.g., a distance from a point of interest, etc.).

Device identifier field 410 stores data or information that identifies a user device and/or a class of user devices. For example, the data or information may include a unique identifier (e.g., an IMEI, an MEID, etc.) pertaining to a user device, or a class or category of user device (e.g., a smartphone, a model and a make, etc.).

Carrier field 415 stores data or information that identifies a carrier. For example, the data or information may indicate a service provider of a wireless service. Access technology field 420 stores data or information that identifies an access technology. For example, an access technology may correspond to LTE, WCDMA, HSPA, etc.

Channel field 425 stores data or information that identifies a channel. For example, a channel may correspond to a channel number, a frequency band, a frequency spectrum, or other suitable channel identifier that identifies a channel in relation to an access technology.

User preferences field 430 stores data or information that indicates a user's preference(s) pertaining to channel-availability information. As previously described, a user may have preferences pertaining to channel-availability information. For example, the user preferences may include cost-related preferences (e.g., lowest cost, roaming, etc.), quality-of-service (e.g., upload or download speeds), access technology, etc. According to such an implementation, device identifier field 410 may also include a user identifier.

Referring back to FIG. 1B, as previously described, in response to receiving the channel-availability request from user device 105, network device 120 selects channel availability information. For example, network device 120 queries channel availability database 400. The query may include location information and a device identifier. The location information and the device identifier correlate with channels available to user device 105 in a given location or geographic area. Network device 120 compares the channels available to user device 105 in the location with channels supported by user device 105. Additionally, the query may include a user preference. Network device 120 may select channels available and supported by user device 105, in view of the user preference.

Network device 120 receives a response to the query and generates a channel-availability response based on the response to the query. The channel-availability response includes information indicating channels supported by user device 105 that are available in the location. For example, the channel-availability response may indicate a carrier (e.g., one or more carriers), an access technology (e.g., one or more access technologies), and a channel (e.g., one or more channels). Network device 120 transmits the channel-availability response that includes the channel-availability information to user device 105.

Referring to FIG. 1C, assume that the user moves to another geographical area that pertains to the channel-availability information received from network device 120. User device 105 uses the channel-availability information to scan and select a channel. For example, a scanning algorithm identifies the supported channels indicated in the channel-availability information and scans one or more of the supported channels. According to this example, it may be assumed that the scanning algorithm scans fewer supported channels than would otherwise, since not all supported channels are available to user device 105 in this geographical area. As a result, user device 105 may reduce time and resources in selecting a supported channel to use, given the location. In FIG. 1D, user device 105 selects a supported channel.

Although FIGS. 1B-1D illustrate exemplary communications and processes, according to other implementations, different messages and/or processes may be performed by user device 105 and/or network device 120. By way of example, user device 105 may generate and transmit a query to network device 120 to obtain channel-availability information, and/or user device 105 may identify the channels supported by and available to user device 105.

Figure 2:
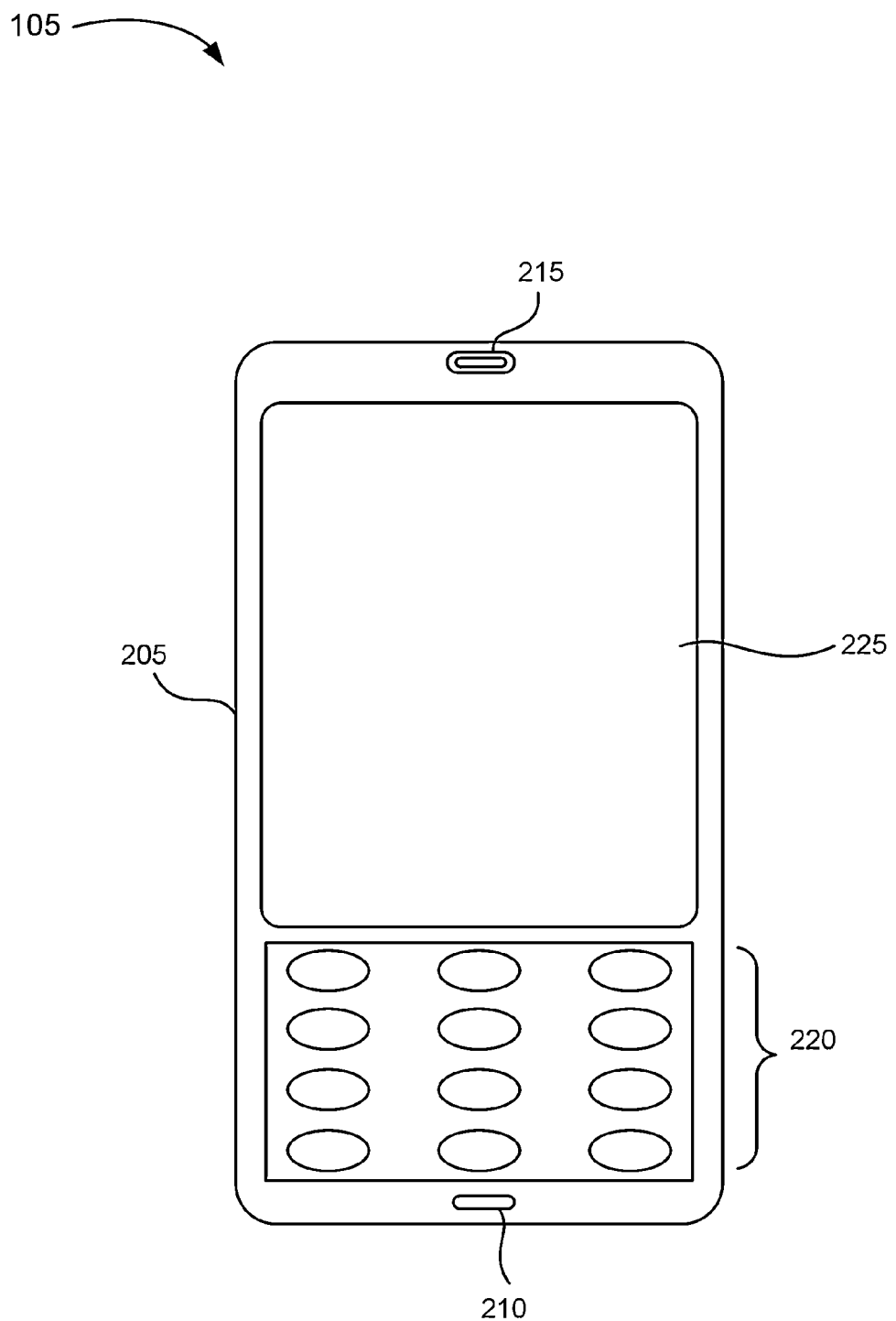
FIG. 2 is a diagram illustrating an exemplary embodiment of a user device.

FIG. 2 is a diagram illustrating exemplary components of an exemplary embodiment of user device 105. As illustrated in FIG. 2, user device 105 may comprise a housing 205, a microphone 210, a speaker 215, keys 220, and a touch display 225. According to other embodiments, user device 105 may comprise fewer components, additional components, different components, and/or a different arrangement of components than those illustrated in FIG. 2 and described herein.

Housing 205 comprises a structure to contain components of user device 105. For example, housing 205 may be formed from plastic, metal, or some other type of material. Housing 205 structurally supports microphone 210, speaker 215, keys 220, and touch display 225.

Microphone 210 comprises a microphone. For example, a user may speak into microphone 210 during a telephone call, speak into microphone 210 to execute a voice command, to execute a voice-to-text conversion, etc. Speaker 215 comprises a speaker. For example, a user may listen to music, to a calling party, etc., through speakers 215.

Keys 220 comprise keys, such as push-button keys or touch-sensitive keys. Keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send a message, place a call, open an application, etc.) and/or allow a user to select and/or navigate through user interfaces or other content displayed by touch display 225. Touch display 225 comprises a display having touch capabilities and/or touchless capabilities (e.g., air touch, air-gesture).

Figure 3:
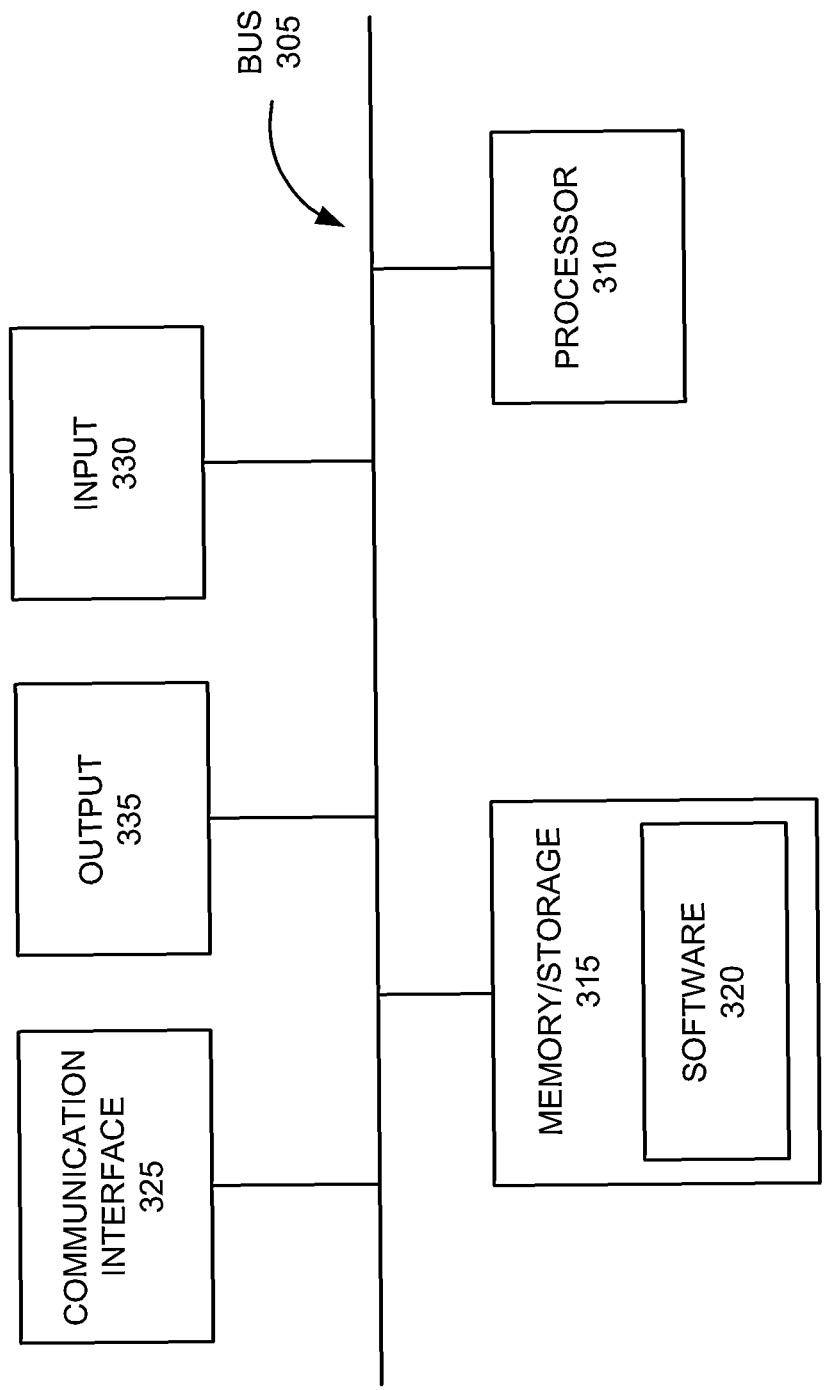
FIG. 3 is a diagram illustrating exemplary components of a device depicted in FIG. 1A.

FIG. 3 is a diagram illustrating exemplary components of a device depicted in FIG. 1A. For example, the device may correspond to user device 105 and/or network device 120. As illustrated, the device comprises a bus 305, a processor 310, memory/storage 315 that comprises software 320, a communication interface 325, an input 330, and an output 335. According to other embodiments, the device may comprise fewer components, additional components, different components, and/or a different arrangement of components than those illustrated in FIG. 3 and described herein. For example, if the device corresponds to user device 105, the device may comprise an accelerometer and/or a location-aware component (e.g., a GPS receiver, etc.).

Bus 305 comprises a path that permits communication among the components of the device. For example, bus 305 may comprise a system bus, an address bus, a data bus, and/or a control bus. Bus 305 may also include bus drivers, bus arbiters, bus interfaces, and/or clocks.

Processor 310 comprises a processor, a microprocessor, a data processor, a co-processor, an application specific integrated circuit (ASIC), a system-on-chips (SOC), an application specific instruction-set processor (ASIP), a controller, a programmable logic device (PLD), a chipset, a field programmable gate array (FPGA), and/or some other processing logic that may interpret and/or execute instructions and/or data. Processor 310 may control the overall operation, or a portion of operation(s) performed by the device. For example, processor 310 may perform operations based on an operating system, various applications, and/or programs (e.g., software 320). Processor 310 may access instructions from memory/storage 315, from other components of the device, and/or from a source external to the device (e.g., another device or a network).

Memory/storage 315 comprises a memory and/or other type of storage medium. For example, memory/storage 315 may comprise one or multiple types of memories, such as, a random access memory (RAM), a dynamic random access memory (DRAM), a cache, a static random access memory (SRAM), a read only memory (ROM), a programmable read only memory (PROM), a ferroelectric random access memory (FRAM), an erasable programmable read only memory (EPROM), s static random access memory (SRAM), a flash memory, and/or some other form of hardware for storing. Memory/storage 315 may comprise a hard disk (e.g., a magnetic disk, an optical disk, a magneto-optic disk, a solid state disk, etc.) and a corresponding drive. Memory/storage 315 may be external to and/or removable from the device, such as, for example, a Universal Serial Bus (USB) memory, a dongle, etc. Memory/storage 315 may store data, software 320, and/or instructions related to the operation of the device.

Software 320 comprises software, such as, for example, an operating system and, application(s) and/or program(s). Software may comprise firmware. By way of example, in the case that the device corresponds to user device 105, software 320 may comprise a telephone application, a voice recognition application, a multi-media application, a texting application, an instant messaging application, etc. According to an exemplary embodiment, user device 105 includes software pertaining to the scanning algorithm, as described herein. By way of example, in the case that device corresponds to network device 120, software 320 may comprise software to manage database 400, select and provide channel-availability information to user 105, and/or perform other processes described herein.

Communication interface 325 comprises a wireless communication interface. For example, communication interface 325 comprises a transmitter and a receiver or a transceiver. Communication interface 325 may operate according to one or multiple protocols, communication standards, or the like. Communication interface 325 permits the device to communicate with other devices, networks, and/or systems.

Input 330 permits an input into the device. For example, input 330 may comprise a keypad (e.g., keys 220), a display (e.g., touch display 225), a touch pad, a button, a switch, a microphone (e.g., microphone 210), an input port, a knob, and/or some other type of input component. Output 335 permits the device to provide an output. For example, output 335 may include a display (e.g., touch display 225), a speaker (e.g., speakers 215), a light emitting diode (LED), an output port, a vibratory mechanism, or some other type of output component.

The device may perform operations or processes in response to processor 310 executing instructions (e.g., software 320) stored by memory/storage 315. For example, the instructions may be read into memory/storage 315 from another storage medium or from another device via communication interface 325. The instructions stored by memory/storage 315 may cause processor 310 to perform various operations or processes. Alternatively, the device may perform processes based on the execution of hardware.

Figure 5A:
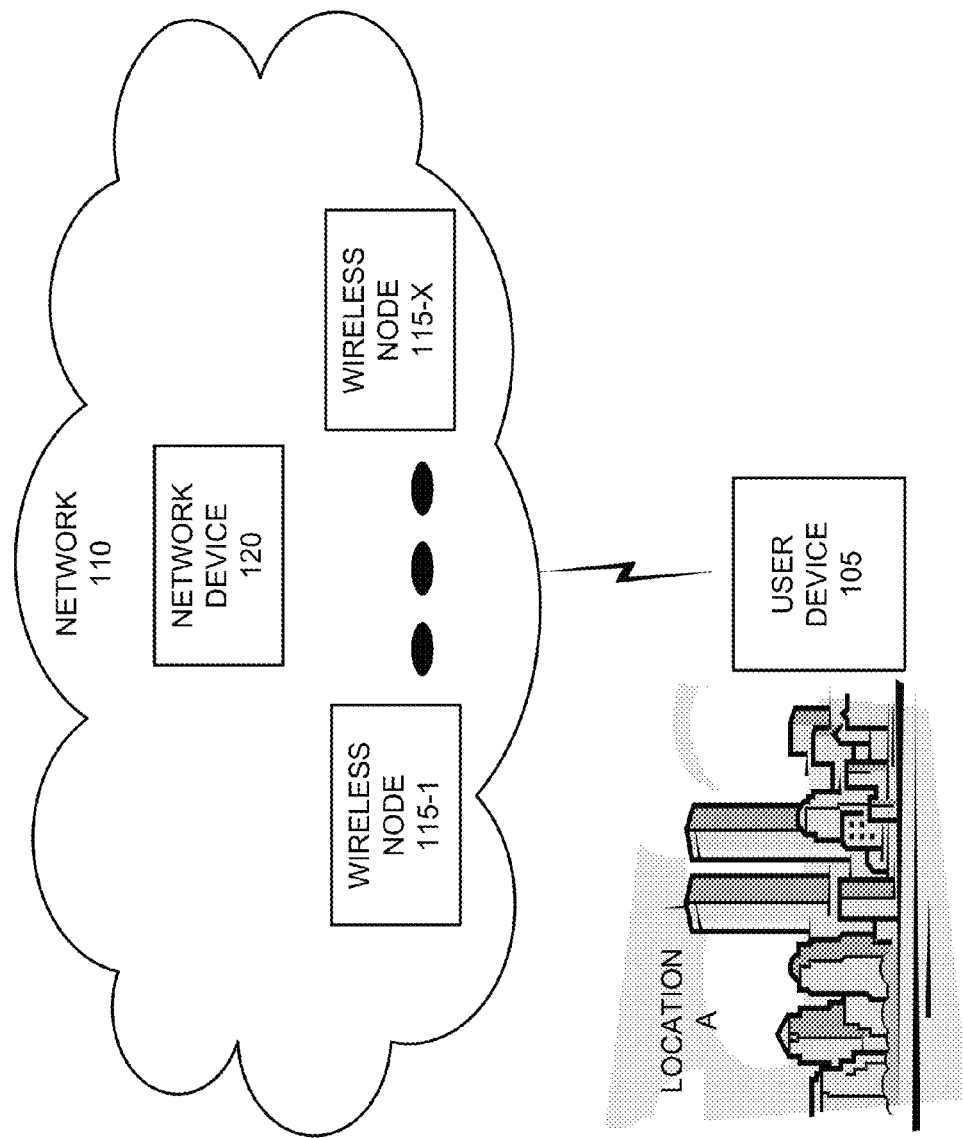
FIGS. 5A and 5B are diagrams illustrating exemplary scenarios pertaining to the scanning of supported channels based on channel-availability information.
Figure 5B:
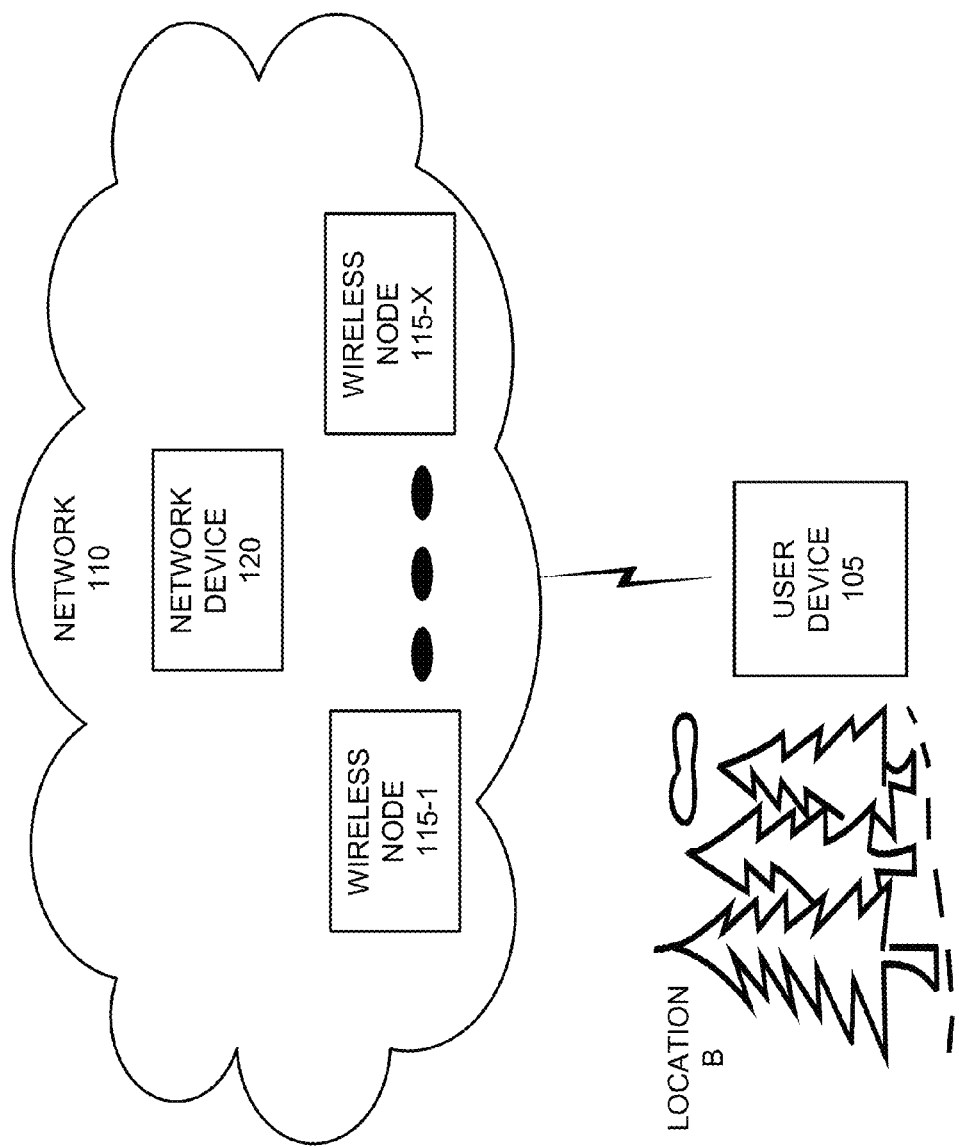

FIGS. 5A and 5B are diagrams illustrating exemplary scenarios pertaining to the scanning of supported channels based on channel-availability information. Referring to FIG. 5A, assume that the user is located in location "A". For example, location "A" provides ample coverage and offers channels that are supported by user device 105. As an example, location "A" may correspond to an area in a city. Subsequently, the user moves into a dead spot and the connection with network 110 is lost. According to an exemplary embodiment, user device 105 comprises logic to recognize that the loss of connection is probably momentary due to its location (e.g., in a city) and the channel-availability (e.g., the number of supported channels, etc.) in the area. Based on this recognition, user device 105 (e.g., the scanning software) automatically initiates a re-scanning for supported channels based on a triggering event. For example, the re-scan may be triggered by a detected movement of or a threshold distance traveled by user device 105 (e.g., based on an accelerometer). According to an exemplary implementation, the scanning algorithm scans the last channel used. According to other exemplary implementations, the scanning algorithm scans the supported channels in an order different than the last channel being first. According to this exemplary use case, the period of time between scanning for a supported channel is lessened relative to a typical use case in which the re-scanning of a supported channel occurs after a pre-determined time period.

Referring to FIG. 5B, assume that the user is located in location "B". According to this scenario, location "B" provides minimal coverage and offers very few channels that are supported by user device 105. Due to the minimal coverage, assume that user device 105 loses its connection with network 110. According to an exemplary embodiment, user device 105 comprises logic to recognize that the loss of connection is probably due to its location and the channel-availability in the area (e.g., based on stored channel-availability information). Based on this recognition, user device 105 automatically reduces the frequency (i.e., the number of times) for re-scanning for a supported channel or ceases to re-scan for a supported channel for an extended time period. In this way, power and other resources of user device 105 are not wasted relative to a typical use case in which the re-scanning of a supported channel occurs after a pre-determined time period.

The scenarios described for FIGS. 5A and 5B are merely exemplary and other processes, not specifically described herein, may be performed depending on the specific circumstances.

According to an exemplary embodiment, user device 105 scans for supported channels based on the default list when channel-availability information does not exist for an area in which the user is currently situated. Additionally, or alternatively, user device 105 scans for supported channels according to a default frequency of scanning when the current location and the number of supported channels is within a normal range. That is, the scenario described in relation to FIG. 5A provides that user device 105 may increase the frequency of re-scanning or initiate a re-scan based on, for example, a recognition that the number of supported, available channels is relatively high, in view of the current location of user device 105. Conversely, the scenario described in relation to FIG. 5B provides that user device 105 may decrease the frequency of re-scanning or cease to re-scan for supported, available channels based on, for example, a recognition that the number of supported channels is relatively low and/or none are available, in view of the current location of user device 105.

Figure 6:
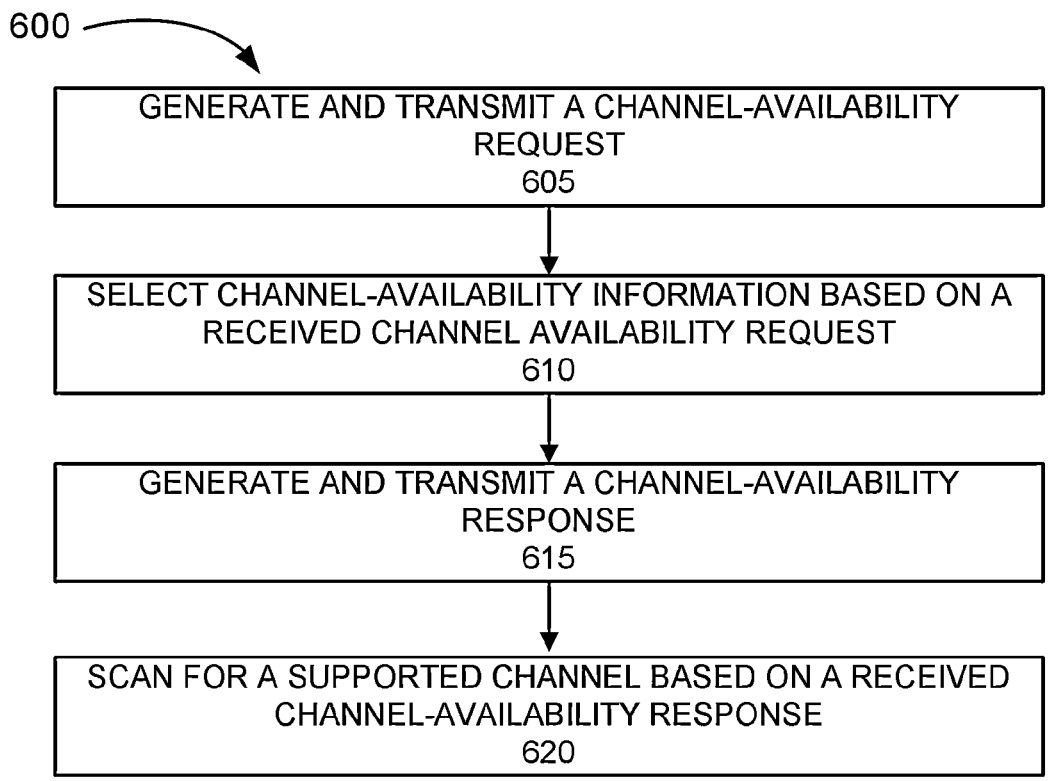
FIG. 6 is a flow diagram illustrating an exemplary process for scanning supported channels based on channel availability information.

FIG. 6 is a flow diagram illustrating an exemplary process 600 for scanning for supported channels based on channel availability information. A step of process 600 is performed by user device 105 or network 120.

Process 600 begins, in block 605, with generating and transmitting a channel-availability request. For example, user device 105 generates a channel-availability request. As previously described, the channel-availability request comprises locale information and user device profile information. Additionally, as previously described, the channel-availability request may comprise preference information. User device 105 transmits the channel-availability request to network device 120.

In block 610, channel-availability information is selected based on a received channel-availability request. For example, network device 120 receives the channel-availability request. As previously described, network device 120 queries a database or a data structure (e.g., channel-availability database 400) that stores channel-availability information. By way of example, the query comprises location information and a device identifier. Channel-availability information is obtained based on a correlation with the location information and the device identifier. The channel-availability information includes information indicating channels supported by and available to user device 105 in the correlated location.

In block 615, a channel-availability response is generated and transmitted. For example, network device 120 generates a channel-availability response. As previously described, the channel-availability response comprises channel-availability information. By way of example, the channel-availability information comprises information indicating a carrier (e.g., one or more carriers), an access technology (e.g., one or more access technologies), and a channel (e.g., one or more channels) supported by user device 105.

In block 620, a supported channel is scanned based on a received channel-availability response. For example, user device 105 receives the channel-availability response. As previously described, scanning software (e.g., comprising a scanning algorithm) scans supported channels indicated in the channel-availability information.

Although FIG. 6 illustrates an exemplary process 600, according to other embodiments, process 600 may include additional operations, fewer operations, and/or different operations than those illustrated in FIG. 6 and described.

Figure 7:
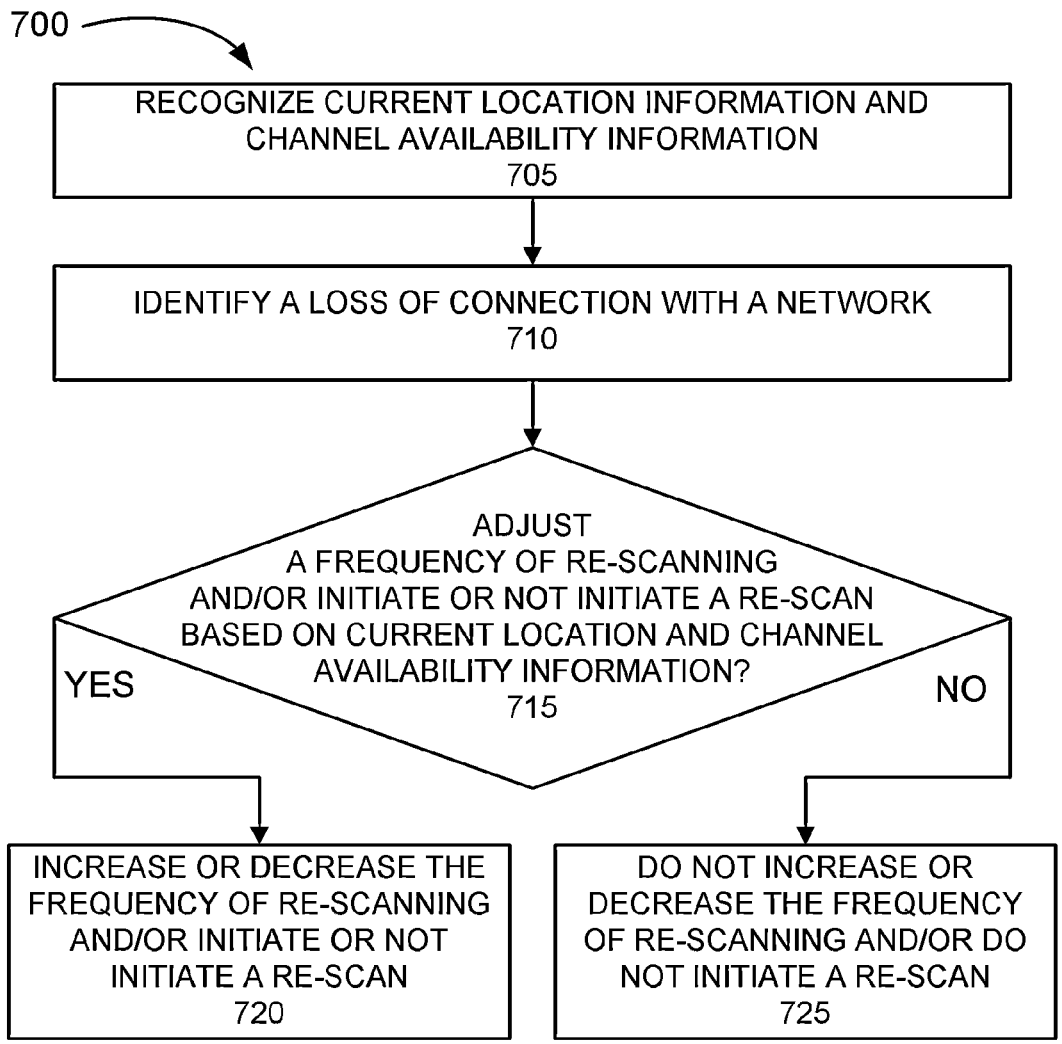
FIG. 7 is a flow diagram illustrating another exemplary process for scanning supported channels based on channel availability information.

FIG. 7 is a flow diagram illustrating an exemplary process 700 for scanning for supported channels based on channel-availability information. Process 700 is performed by user device 105.

Process 700 begins, in block 705, with recognizing a current location and channel-availability information. For example, user device 105 may obtain current location information (e.g., from network 110, GPS, etc.) and channel-availability information (e.g., network 110, database 400, etc.).

In block 710, a loss of connection with a network is identified. For example, user device 105 loses a connection with network 110 and identifies that the connection is lost.

In block 715, it is determined whether the frequency of re-scanning is to be adjusted and/or whether to initiate a re-scan based on the current location and channel-availability information. For example, user device 105 determines whether the scanning software of user device 105 should increase or decrease the frequency of re-scanning for a supported channel and/or whether to initiate a re-scanning of a supported channel based on the current location information and the channel-availability information. By way of example, user device 105 calculates a likelihood of successfully finding a supported channel, in view of the connection loss, based on the current location of user device 105 and the channel-availability information. For example, user device 105 calculates a likelihood of success based on the number of supported, available channels before the connection loss and the current location of user device 105. User device 105 may also consider other factors, such as the amount of time that transpired from the previous scan and/or movement information (e.g., direction, speed, distance traveled) associated with user device 105 between connection establishment and connection loss.

If it is determined that the frequency of re-scanning should be adjusted and/or a re-scan should or should not be initiated (block 715-YES), then the frequency of re-scanning is adjusted and/or a re-scan is initiated or not initiated (block 720). For example, user device 105 changes the frequency of re-scanning (e.g., relative to a default frequency) for a supported channel or immediately initiates a re-scan or ceases to re-scan (e.g., for a pre-determined time period or until a triggering event occurs). By way of example, assume that the current location provides a high number of supported, available channels (e.g., a high threshold number may be used for comparison), user device 105 may immediately initiate a re-scan or increase the frequency of re-scanning so as to select a supported channel and establish another connection with network 110. Conversely, by way of example, assume the current location provides a low number of supported, available channels (e.g., a low threshold number may be used for comparison), user device 105 may cease to re-scan until a triggering event occurs (e.g., movement information indicates a threshold distance traveled) or reduce the frequency of re-scanning.

If it is determined that the frequency of re-scanning should not be adjusted and/or a re-scan should be or should not be initiated (block 715-NO), then the frequency of re-scanning is not adjusted (block 725). For example, user device 105 does not change the frequency of re-scanning for a supported channel nor immediately initiates a re-scan nor ceases to re-scan. For example, if user device 105 determines that the number of supported channels is within a normal range (e.g., an average threshold number may be used for comparison), then the default frequency of re-scanning is not adjusted.

Although FIG. 7 illustrates an exemplary process 700, according to other embodiments, process 700 may include additional operations, fewer operations, and/or different operations than those illustrated in FIG. 7 and described.

The foregoing description of embodiments provides illustration, but is not intended to be exhaustive or to limit implementations to the precise form disclosed. Modifications and variations of the embodiments and/or implementations are possible in light of the above teachings, or may be acquired from practice of the teachings. For example, according to other implementations, user device 105 may not transmit a channel-availability request to network device 120. Rather, network device 120 may identify the presence and/or connectivity of user device 105 and proactively transmit channel-availability information to user device 105. Additionally, or alternatively, one or more functions or processes described as being performed by network device 120 may be performed by user device 105.

An embodiment can also be implemented through computer readable code/instructions stored by a storage medium. A storage medium may comprise one or more of the storage media described above in relation to memory/storage 315. The storage medium may also comprise other data and/or information, such as a data file, a data structure, a program module, an application, etc. Computer readable code may comprise both machine code, such as produced by a compiler, and files comprising higher level code that may be executed by a computational device using, for example, an interpreter.

The flowcharts and blocks illustrated and described with respect to FIGS. 6 and 7 illustrate exemplary processes according to an exemplary embodiment. However, according to other embodiments, the function(s) or act(s) described with respect to a block or blocks may be performed in an order that is different than the order illustrated and described. For example, two or more blocks may be performed concurrently, substantially concurrently, or in reverse order, depending on, among other things, dependency of a block to another block.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

The term "logic" or "component," when used in the specification may include hardware (e.g., processor 310), a combination of hardware and software (software 320), a combination of hardware, software, and firmware, or a combination of hardware and firmware.

The terms "a," "an," and "the" are intended to be interpreted to include both the singular and plural forms, unless the context clearly indicates otherwise. Further, the phrase "based on" is intended to be interpreted to mean, for example, "based, at least in part, on," unless explicitly stated otherwise. The term "and/or" is intended to be interpreted to include any and all combinations of one or more of the associated list items.

In the specification and illustrated by the drawings, reference is made to "an exemplary embodiment," "an embodiment," "embodiments," etc., which may include a particular feature, structure or characteristic in connection with an embodiment(s). However, the use of these terms or phrases does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction disclosed in the specification should be construed as critical or essential to the embodiments described herein unless explicitly described as such.

What is claimed is:

1. A user device comprising:
   a communication interface;
   one or more memories, wherein the one or more memories store instructions; and
   one or more processors, wherein the one or more processors are configured to execute the instructions to:
   receive, via the communication interface, channel-availability information that indicates one or more channels supported by and available to the user device;
   store the channel-availability information;
   scan one or more channels indicated in the channel-availability information;
   connect, via the communication interface, to a network using one of the one or more channels identify a connection loss to the network; and
   adjust a frequency in which the user device scans for a channel based on a number of supported and available channels indicated by the channel-availability information.

2. The user device of claim 1, wherein the one or more channels pertain to one or more channels supported by the user device and available to the user device in a current location of the user device.

3. The user device of claim 1, wherein the one or more channels are less than a total number of channels supported by the user device, and wherein the one or more channels pertain to one or more channels supported by the user device and available to the user device in a location other than the current location of the user device.

4. The user device of claim 1, wherein the one or more processors are further configured to execute the instructions to:
   generate a request to obtain the channel availability information, wherein the request indicates a current location of the user device or a location other than the current location of the user device, and one or more of user device capability information or user preference information; and
   transmit the request to the network.

5. The user device of claim 1, wherein, when adjusting, the one or more processors are further configured to execute the instructions to:
   recognize that the number of supported and available channels is high based on a comparison to a threshold value; and
   increase the frequency in which the user device scans relative to a default frequency.

6. The user device of claim 1, wherein, when adjusting, the one or more processors are further configured to execute the instructions to:
   recognize that the number of supported and available channels is low based on a comparison to a threshold value; and
   decrease the frequency in which the user device scans relative to a default frequency.

7. The user device of claim 1, wherein the user device comprises a mobile communication device having telephone capabilities, wherein the one or more processors are further configured to execute the instructions to:
   calculate a likelihood of successfully finding a supported channel in response to an identification of the connection loss, wherein the likelihood of successfully finding the supported channel is based on a number of supported channels available before the connection loss and a current location of the user device.

8. A method comprising:
   receiving channel-availability information that indicates one or more channels supported by and available to a user device in a location;
   storing the channel-availability information;
   scanning one or more channels indicated in the channel availability information when the user device is located in the location;
   connecting to a network using one of the one or more channels
   identifying a connection loss to the network; and
   adjusting a frequency in which the user device scans for a channel based on a number of supported and available channels indicated by the channel-availability information.

9. The method of claim 8, wherein the channel-availability information indicates an order in which the user device scans, wherein the order is based on one or more of monetary cost to a user of the user device or an application or a service specified by the user to be used by the user of the user device and a channel characteristic.

10. The method of claim 8, wherein the adjusting comprises:
    recognizing that the number of supported and available channels is high based on a comparison to a threshold value; and
    increasing the frequency in which the user device scans relative to a default frequency.

11. The method of claim 8, wherein the adjusting comprises:
    recognizing that the number of supported and available channels is low based on a comparison to a threshold value; and
    decreasing the frequency in which the user device scans relative to a default frequency.

12. The method of claim 8, further comprising:
    transmitting a channel-availability request that comprises location information and a device identifier pertaining to the user device.

13. The method of claim 8, wherein the adjusting further comprises:
    ceasing to scan, in response to the identifying, for a supported channel until a triggering event occurs.

14. The method of claim 13, wherein the triggering event comprises that the user device moves a predetermined distance from a location that the connection loss occurred.

15. The method of claim 8, further comprising:
    selecting channel-availability information based on location information and a device identifier associated with the user device, wherein the selecting comprises:
    identifying one or more channels and one or more access technologies supported by the user device;
    identifying one or more channels and one or more access technologies available to the user device in correspondence to the location information; and
    selecting one or more channels and one or more access technologies that are available to the user device in correspondence to the location information.

16. A non-transitory storage medium storing instructions executable by a device, wherein the instructions comprise instructions to:

receive channel-availability information that indicates one or more channels supported by and available to a user device in a location;

store the channel-availability information;

scan one or more channels indicated in the channel availability information when the user device is located in the location;

connect to a network using one of the one or more channels identify a connection loss to the network; and adjust a frequency in which the user device scans for a channel based on a number of supported and available channels indicated by the channel-availability information.

17. The non-transitory storage medium of claim 16, wherein the channel-availability information indicates an order in which the user device scans, wherein the order is based on one or more of monetary cost to a user of the user device or an application or a service specified by the user to be used by the user of the user device and a channel characteristic.

18. The non-transitory storage medium of claim 16, wherein the instructions comprise instructions to:

determine whether to adjust the frequency in which the user device scans for a channel based on the number of supported and available channels at a current location.

19. The non-transitory storage medium of claim 16, wherein the instructions to adjust comprise instructions to:

recognize that the number of supported and available channels is high based on a comparison to a threshold value; and increase the frequency in which the user device scans relative to a default frequency.

20. The non-transitory storage medium of claim 16, wherein the instructions to adjust comprise instructions to:

recognize that the number of supported and available channels is low based on a comparison to a threshold value; and decrease the frequency in which the user device scans relative to a default frequency.

* * * * *